United States Patent [19]

Andrews et al.

[11] Patent Number: 5,251,684
[45] Date of Patent: Oct. 12, 1993

[54] METHOD FOR CONTROLLING THE OXIDATION AND CALCINATION OF WASTE FOUNDRY SANDS

[75] Inventors: Robert S. L. Andrews; Gerald J. Reier, both of Fort Worth, Tex.

[73] Assignee: GMD Engineered Systems, Inc., Fort Worth, Tex.

[21] Appl. No.: 803,047

[22] Filed: Dec. 6, 1991

[51] Int. Cl.$^5$ .................................................. B22C 5/00
[52] U.S. Cl. ........................................ 164/456; 164/5; 241/DIG. 10
[58] Field of Search .................. 164/5, 456; 241/33, 241/DIG. 10, 30

[56] References Cited

U.S. PATENT DOCUMENTS

| | | | |
|---|---|---|---|
| 4,437,834 | 3/1984 | Vogel | 164/5 |
| 4,478,572 | 10/1984 | Selli | 164/5 X |
| 4,508,277 | 4/1985 | Andrews | 164/5 X |
| 4,978,076 | 12/1990 | Andrews et al. | |

FOREIGN PATENT DOCUMENTS

| | | | |
|---|---|---|---|
| 60-191631 | 9/1985 | Japan | 164/5 |
| 63-180340 | 7/1988 | Japan | 164/5 |

Primary Examiner—J. Reed Batten, Jr.
Attorney, Agent, or Firm—Charles D. Gunter, Jr.

[57] ABSTRACT

The waste sands are passed to a calcining chamber having a floor, connecting sidewalls and a top. The floor of the calcining chambers provided with a plurality of vents. The calcining chambers also connected to a separate firebox which produces fluidizing hot gases for fluidizing waste sands within the calcining chamber and forming a fluidized sand bed. The fluidizing hot gases are introduced into the calcining chamber by means of the floor vents. By precisely controlling the temperature of the waste sands within the fluidized bed, a more consistent product is produced while maintaining the temperature of the waste sands below a critical temperature at which the organic binders present on the sand grains would be fused to the waste sand grains.

9 Claims, 4 Drawing Sheets

METHOD FOR CONTROLLING THE OXIDATION AND CALCINATION OF WASTE FOUNDRY SANDS

BACKGROUND OF THE INVENTION

1. Field of the Invention

The present invention relates generally to a method for reclaiming used foundry sands and, specifically, to a method for controlling the oxidation of residual organic binders and calcination of residual inorganic binders adhering to the surface of sand grains in waste foundry sands.

2. Description of the Prior Art

Foundry sand is commonly used to make core molds into which ferrous and non-ferrous metals are cast. The core molds consist of sand bonded with special additives including inorganic binders such as clay and organic binders, such as phenols, melamine, or urea formaldehyde.

Previously, after the casting had set within the mold, the mold was broken away and discarded. Various factors such as the depletion of natural sand deposits and the cost of disposing of used sand in accordance with recent environmental regulations have now made it economical and advantageous to reclaim the used sand for repeated use.

The type binder used has, in the past, generally dictated the type of reclamation process utilized. Thus, for the inorganic, clay-bonded sands, so-called "wet" and "dry" scrubbing techniques have been employed. U.S. Pat. No. 2,261,947, to Barnebl et al., issued Nov. 11, 1941, entitled Foundry Practice, utilizes the wet scrubbing method in which clay-bonded sands are cleaned in a blasting room by means of high pressure streams of water and sand projected from guns. In the "dry" scrubbing technique, the "dry" sand is projected against an abrasive surface to crack off the clay binder. In both cases, the cleaning action is that of mechanical attrition.

For sands utilizing organic resin binders, thermal reclamation techniques have commonly been employed. For example, U.S. Pat. No. 2,478,461, to Connolly, issued Aug. 9, 1949, entitled Apparatus and Method for Treating Foundry Sand, discusses the reclaiming of foundry sand by heating or roasting treatment which causes the organic binders to be burned away. The prior art thermal reclamation techniques have included the use of multiple-hearth type furnaces with mechanical "rabble arms" which worked over the used sand and moved the sand through the hearth at elevated temperatures.

None of the previously described techniques proved to be entirely satisfactory for use in reclaiming both the clay-bonded and organic resin-bonded sands, as where a mixture of these sands is present. Consistency of final product was also a problem with prior art systems. Also, the efficiency of the previous techniques do not exceed about 70%, with the balance of the waste sand being discarded after each reclamation cycle into municipal landfills.

U.S. Pat. No. 4,549,698, issued Oct. 29, 1985, to Andrews, entitled Method of Reclaiming Foundry Sand, and assigned to the assignee of the present invention, presented a novel method for reclaiming mixtures of both organic resin-bonded sands and clay-bonded sands. The method utilized a triple fluid bed thermal reactor which combined thermal and abrasive action within the beds to remove both resin-bonded and clay-bonded materials in one continuous operation.

U.S. Pat. No. 4,978,076, issued Dec. 18, 1990, to Andrews and Reier, entitled Method for Separating Hazardous Substances in Waste Foundry Sands and assigned to the assignee of the present invention, presented further improvements in techniques for separating silica sand grains from layers of organic and inorganic binders adhering to the surface of the sand grains so as to reclaim the sand for reuse in foundry manufacturing processes. The technique was especially adapted for separation of hazardous components, such as lead, from the sand aggregates.

The present invention is directed to further improvements in thermal sand reclamation techniques by providing precise control of the temperature and oxygen content in the fluidizing gases used in the previously described reactor fluid beds, particularly in the calcination fluid bed. It is this stage in the reclamation process that determines whether the inorganic binders are separated from or fused onto the used sand grain surfaces. While other thermal reclamation techniques have been utilized in the prior art in an attempt to reclaim waste foundry sand utilizing organic resin binders, those techniques employing fluid bed technology generally inject and burn any supplemental fuel gas required to heat the sand bed in and into the sand bed itself. Precise temperature control of such a random fuel mixture was difficult or impossible to achieve and extreme unevenness of heat within the bed resulted. As a result, the physical and chemical properties of the reclaimed sand were found to vary so that the physical properties of the resulting molds and cores varied as well.

Another problem which existed in those prior art processes where inorganic binders were mixed with organic binders for thermal reclamation by burning in a fluid bed, and where supplementary gas or fossil fuel was introduced over the surface of or into the fluidized bed, was the creation of "hot spots" within the calcining fluid bed due to random combustion. The result was a random "fusing" of inorganic binders to the sand grain surfaces, rendering them unsuitable for making molds and cores by rebonding with resin binders. As a result, those fluid bed units employing direct combustion of fuel gas and resin binders in the fluid bed have not proved to be successful in practice, particularly when operated on a mixture of inorganic and organic waste sands to thermally reclaim the sand for reuse in making molds and cores rebonded with acid catalyzed resin binders.

The present invention has as its object to provide a method for controlling the rate of oxidation and calcination of a random mixture of organic and inorganic bonded waste foundry sands to ensure consistent physical and chemical sand properties when reused with organic binders.

A further object of the invention is to maximize the desirable physical properties of the rebonded molds and cores, allowing the use of the same or less resin binder than with new sand, as a result of consistent sand qualities very similar and equal to the qualities of new sand.

SUMMARY OF THE INVENTION

The method of the invention is used for controlling the oxidation and calcination of waste foundry sands during a thermal reclamation process where the waste foundry sands have binders with a fuel content adhering thereto. The waste sands are passed to a calcining chamber having a top, a floor and connecting sidewalls. The floor of the calcining chamber is provided with a plurality of vents and the calcining chamber is connected to a separate firebox capable of producing fluidizing hot gases for fluidizing the waste sands within the calcining chamber and forming a fluidized sand bed. The fluidizing hot gases are introduced to the calcining chamber by means of the floor vents.

Combustion means are provided in the firebox for producing the fluidizing hot gases. Preferably, the combustion means includes a burner, a source of supplementary fuel for the burner, a source of primary combustion air for the burner and a source of secondary combustion air for the firebox.

A first signal generating means is provided for producing a first signal representative of the temperature of the waste sands within the fluidized sand bed. A second signal generating means produces a second signal representative of the volume of available free oxygen in the fluidizing hot gases within the firebox and in turn entering the calcining chamber through the floor vents. Control means are provided for analyzing the first and second signals and for precisely controlling the temperature of the waste sands within the fluidized sand bed with respect to a preselected set point by adjusting the rate of waste sand feed entering the calcining chamber and by adjusting the quantity of supplementary fuel totally combusted in the firebox. Preferably, the control means is a proportional, integral, derivative control system under the command of a preprogrammed logic computer.

Preferably, a heat energy requirement is calculated for calcining the waste foundry sands within the calcining chamber. The heat energy requirement is calculated by combining the heat energy content of the binder fuels adhering to the waste sand grains entering the calcining chamber, together with the heat energy content of the combusted fluidized hot gases produced by the combustion means in the firebox. The control means is operated to vary the mass flow rate of waste sand introduced into the calcining chamber, the volume of supplementary fuel supplied to the burner, the primary air supplied to the burner and the secondary air supplied to the firebox depending upon the calculated heat energy requirement of the process.

Preferably, the waste sands being introduced into the calcining chamber include sand grains having both organic and inorganic binders adhering thereto. The mass flow rate of the waste sands introduced into the calcining chamber, the volume of primary air and fuel supplied to the burner and the volume of secondary air supplied to the firebox are all controlled to precisely control the temperature of the waste sands in the fluidized bed of the calcining chamber to maintain the temperature of the sands below a critical temperature at which the organic binders would be fused to the waste sand grains.

Additional objects, features and advantages will be apparent in the written description which follows.

DETAILED DESCRIPTION OF THE INVENTION

Figure 4:
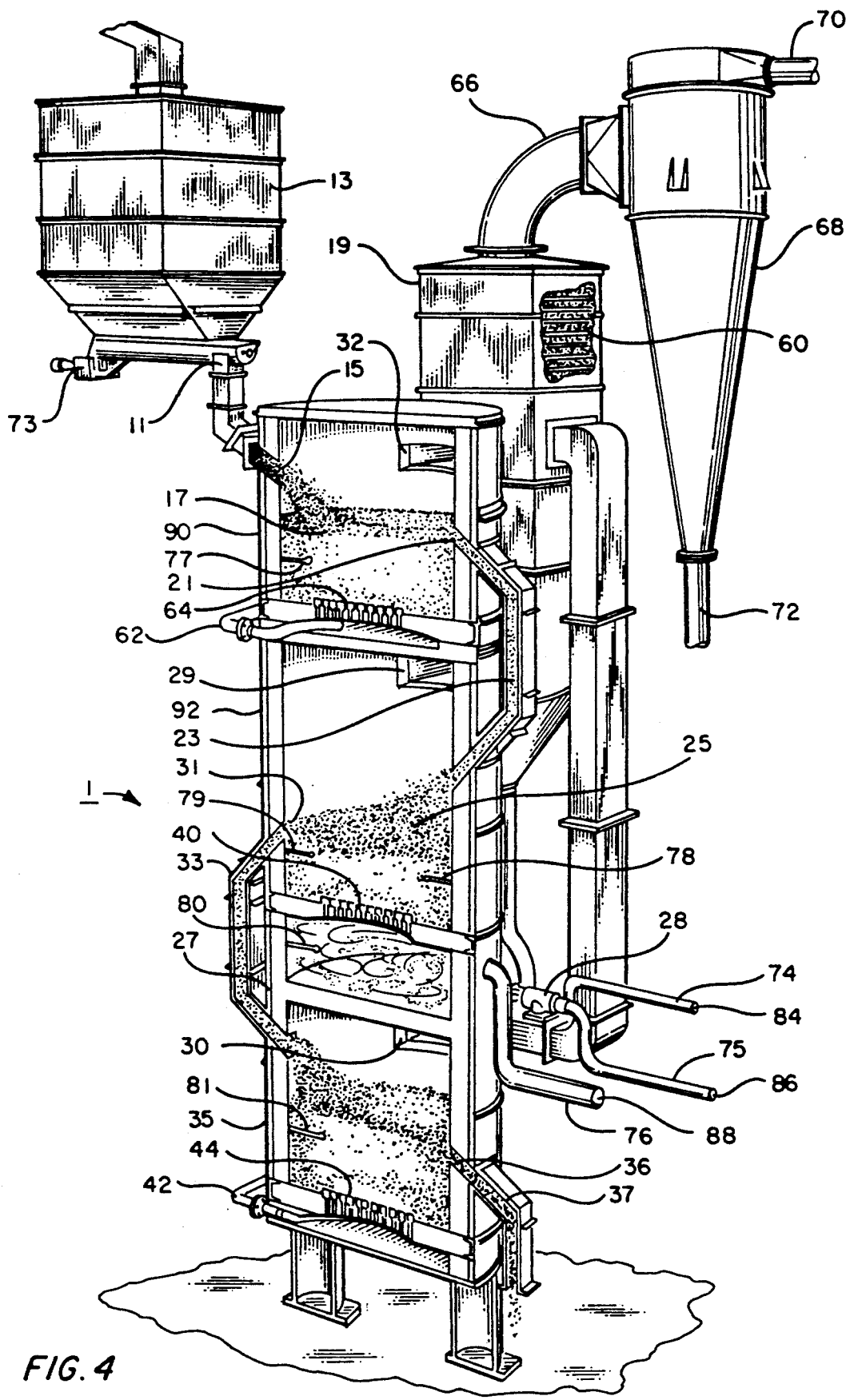
FIG. 4 is a schematic diagram of the fluid bed reactor showing the waste sand feed drive, the firebox combustion supply lines and the thermocouple sensing points which make up a part of the control system.

An apparatus which can be used to practice the method of the invention will be described with reference to FIG. 4. The flowable, waste foundry sand is metered from a surge bin 13, through inlet 15 into a preheat chamber 90 of a thermoreactor (designated generally as 1 in FIG. 4). Preheat chamber 90 comprises a first stage fluid bed 17 which rapidly raises the ambient temperature of the feed material to a fluid bed temperature above 350° F. The first stage fluid bed temperature is maintained by the hot fluidizing air that has been heated by waste heat energy from the reactors' flue gas as it passes through a heat recuperator 19 and which is supplied to the first stage fluid bed through the floor vent 64, as will be subsequently explained. A thermocouple 77 in the fluid bed 17, along with thermocouple 78, 79, 80 and 81 continuously monitor process temperatures.

The oxygen in the hot fluidizing air is used to begin oxidation of the organic binders present on the sand grains in the feed material during an approximate one hour retention time in the first stage fluid bed. The organic compounds present in the feed material are principally fossil fuels, such as powdered coal, coke, pitch or aromatic hydrocarbons such as phenols, coal, tar and synthetic resins. These chemical compounds begin to be destroyed at elevated temperature by the heavily oxidizing atmosphere which is created within the hot air fluid bed 17. The off gases from the bed 17, principally carbon dioxide and hydrogen oxide, pass out the duct 32.

The passage of hot air upward in countercurrent fashion through the fluid bed causes a boiling action in the sand mass. As a result, the base aggregate with inorganic compounds still adhering to the surface of the sand grains, passes over a weir 21 and travels down an external by-pass duct 23 into a second stage, calcining chamber 92 having a calcining fluid bed 25 where the temperature of the fluid bed 25 is rapidly raised from its 350° to 500° F. range to a calcining temperature preset within the 1400° to 1700° F. range. As the organic compounds enter the calcining fluid bed 25, they are completely oxidized, adding their "available heating value" to the fluid bed, thus raising its temperature.

The inorganic compounds entering the calcining fluid bed have their temperature raised by heat energy from the fluid bed to begin their calcination phase during the one hour retention time within the calcining bed.

The hot fluidizing gases are supplied to the calcining fluid bed 25 from a firebox 27. As will be further described, the mixing of the combustion products and excess air takes place at a controlled rate within the pressurized firebox 27. Although the firebox 27 is shown directly below the calcining bed 25 in FIG. 4, it can be situated in other locations in close proximity to the calcining bed. A burner 28 is mounted in the sealed firebox 27 to provide combustion. Primary air is supplied to the burner 28 through a primary supply line 75 while secondary air is supplied through a secondary supply line 76. The products of combustion in the firebox are vented through a plurality of vents 40 in the roof of the firebox 27 which is also the floor of the calcining chamber 92 in the embodiment illustrated.

The oxygen provided by up to 100% excess secondary fluidizing air completes the oxidation of any residual hydrocarbons trapped within the laminar layers of the inorganic compounds on the aggregate surface. In a typical foundry operation, these inorganic compounds consist mainly of bentonite clays, either Western or Southern, China clay or fire clay, depending upon the type of metal cast upon the sand molds. Each type of clay has a characteristics pH which determines the optimum calcining temperature for the calcining chamber 92. At a calcining temperature directly related to the proportioning of these clays, namely 1450° F. for Southern bentonites and 1700° F. for Western bentonites, the fixed moisture retained within these inorganic compounds initiates a crystalline transformation during the one hour retention time within the calcining bed 25. This crystalline transformation causes the laminar clay layers to separate from the sand grains as dust, rather than being "fixed" in insoluble form on the sand grain.

On being released, the aggregate dust, clay fines and metallic dust are transported out of the fluid bed 25 through duct 29 to mix with the other off-gases passing out ducts 30, 32 of the other, two chambers before being passed through the reactors heat recuperator 19.

The calcined aggregate remaining in the second stage bed 25 passes over a weir 31 and through an external by-pass duct 33 by gravity feed to a third stage or pre-cooling bed 35. Ambient fluidizing air is supplied from a conventional rotary blower (not shown) through the supply line 42 and through vents 44 to the pre-cooling bed 35. The temperature of the material entering the bed 35 rapidly falls to about 500° to 700° F. due to the influx of ambient fluidizing air during the one hour retention time in the bed 35. From the pre-cooling bed 35, the sand is discharged by gravity feed over a weir 36 and through a passage 37 to a post-cooling stage, e.g., a fluid bed sand cooler, prior to clay de-dusting. The hot air, heated as a result of cooling the aggregate down from its calcining temperature to the 500° to 700° F. range is transported out of the fluid bed 35 through the duct 30 to mix with the off-gases from the other two chambers before being passed through the reactors' heat recuperator 19.

The heat recuperator 19 has internal air passageways 60 which are exposed to the heat in the waste gases exiting each of the chamber ducts 29, 30, 32. Ambient air is supplied from a rotary blower (not shown) to the internal passageway 60. The air is heated in the internal passageway 60 and is routed through a conduit 62 to the vent 64 in the floor of the preheat chamber 90, thru a conduit 86 to the firebox as secondary air (preheated) and thru conduit 86 to the burner as preheated air to combine with the supplementary gases.

The gases exiting the recuperator 19 pass through duct 66 to a cyclonic particle separator 68 with the fine particles passing out the top duct 70 to a dust collector (baghouse) and the coarse particles to be separated pass out the bottom duct 72.

The aggregate discharged from the post-cooling unit at ambient temperature (85° to 100° F.) is fed into a pneumatic attrition clay de-duster to remove the residual calcined clay particles from the cracks and crevices of the aggregate. Clay de-dusters of this type will be familiar to those skilled in the art and are commercially available, for example, the NECO Attrition Scrubber available from National Engineering Company of Chicago, Illinois. It is this stage where the residual clays are removed and the organic residues scrubbed from the sand grains, the final step that control the Acid Demand Value (ADV) of the aggregate with respect to its re-bonding properties using a core binder system based on an alkaline catalyst. The de-dusted aggregates are conveyed from the de-duster to bulk storage silos for reuse in either the clay-bonded or resin-bonded molding lines or for core making operations.

The control system for precisely controlling the temperature of the sand mass in the respective fluid beds will now be described in greater detail.

As the organic compounds present on the waste sand grains enter the calcining fluid bed 25, they are completely oxidized, adding their "available heating value" to the fluid bed, thus raising its temperature. When this occurs the supplementary fuel gas, supplied to the burner through supply conduit 74, is reduced in response to signals received from the pre-set process thermocouple sensor 79 in the calcining fluid bed 25 under the control of the preprogrammed logic controller. This condition will hold until the amount of organic compounds entering the fluid bed decreases, then the fuel gas supply is increased in response to signals received from the process thermocouple sensor 79. This "cycling" is continuous as long as the "available heating value" of the oxidizing organic compounds do not increase to a point at which they drive the calcining fluid bed temperature beyond the pre-set range, plus 10° F., after the supplementary fuel gas supply is completely shutoff.

If this occurs, the stored heat energy in the refractory lining of the firebox 27 is depleted to a point where the thermocouple sensor 79 in the calcining fluid bed 25 will signal the preprogrammed logic controller to shutoff the waste sand feed 15 to the preheat fluid bed 17 which, in turn, will shutoff the degraded waste sand feed 23 to the calcining chamber 92.

To prevent the falling firebox temperature from shutting off the waste sand feed until the calcining fluid bed temperature decreases to within the pre-set process control range, that is, plus and minus 5° F., the supplementary fuel gas supply (from supply conduit 74) has a pre-set minimum heat input equal to the heat loss of the firebox refractory lining. The secondary air volume supplied through line 76 at this point in the process is also set equal to the minimum required to maintain 10% free oxygen and fluidization in the calcining sand bed. Under this control condition, the only source of heat input to the calcining fluid bed is the "available heat value" of the oxidizing organic compounds in the calcining fluid bed at the instant the waste sand feed 23 is shutoff.

In actual practice, the continuous cycling between the waste sand volume feed 11 and the supplementary fuel gas supply 74 is accomplished by means of a motorized, variable speed drive on the waste sand feeder 73 and a motorized variable port valve (84, 86, 88 in FIG. 4) on each of the fuel 74, primary air 75 and secondary air 76 supply lines, which are controlled in a manner which will be explained in greater detail below. The fuel and primary air are maintained at stoichiometric ratio throughout their operating range. The secondary air is maintained at up to 100% excess over primary air volume and above minimum fluidizing air volume. The speed of the waste sand feeder is calibrated at 33.34 pounds a minute per ton of reactor capacity based on a nominal residual binder content of 0.6% by weight of the sand aggregate or an "available heat value" of 153,000 BTUs. When consumed in the calcining chamber of the fluid reactor, this represents 27% of the process heat energy required for the thermal sand reclamation at about 1500° F. and at 100% thermal efficiency. The balance of the process heat energy plus the thermal losses of the system is supplied by the supplementary fuel, either natural gas, LP gas or light fuel oil combusted in the firebox 27.

Figure 1:
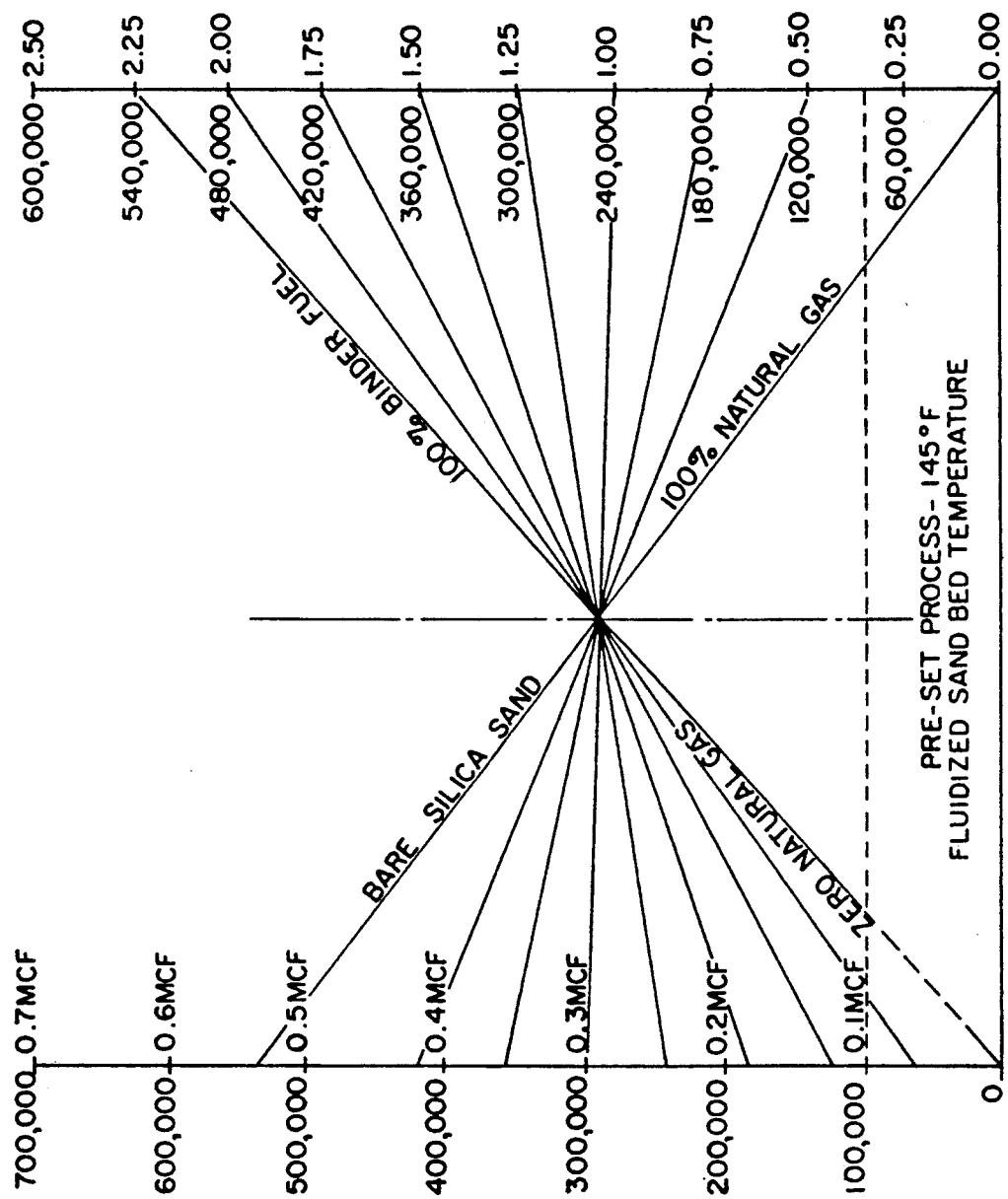
FIG. 1 is a diagram showing the calculated heat energy requirement for varying resin binder fuels and natural gas inputs.
Figure 2:
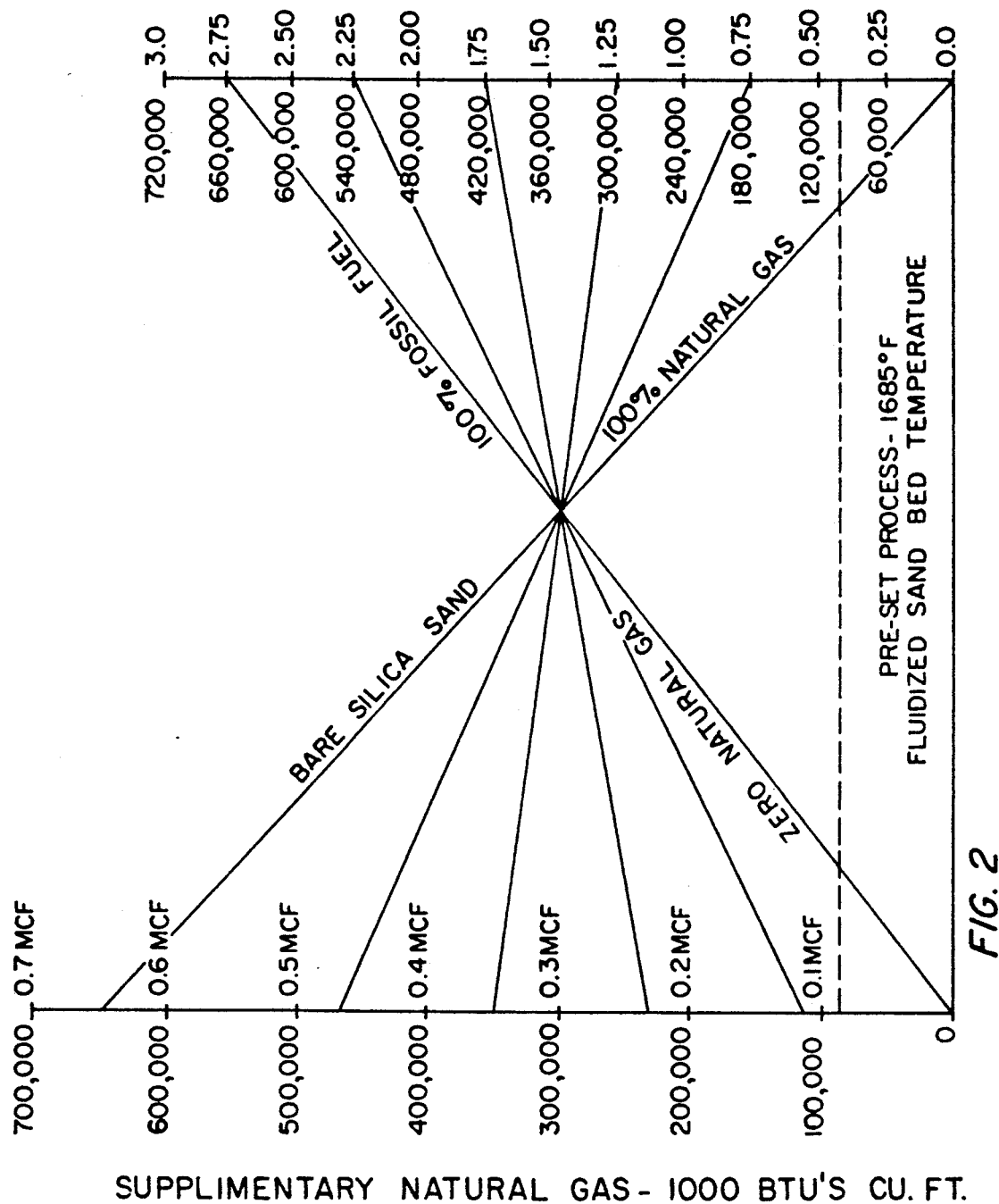
FIG. 2 is a similar diagram showing the heat energy requirement calculation under varying fossil fuel and natural gas inputs.

The heat energy relationship between resin fuel and natural gas is shown in FIG. 1 and the heat energy relationship between clay-bonded fuel and natural gas is shown in FIG. 2. The data for both types of fuel shown in FIGS. 1 and 2 is based on practical field operation of a fluid reactors of the type shown in FIG. 4 and is used to compile process temperature set points, temperature ramp up and down rates. The data is also used to monitor nonstandard thermocouples from all zones within the reactor, to linearize their outputs, detect failures and to switch to a backup system when required. A temperature sequence program calculates and controls heat energy levels for each zone using a PID algorithm. PID controllers will be familiar to those skilled in the art and are described, for example, in *Modern Control System*, R. C. Dorf, Addison-Wesley Fifth Edition, 1989, pages 449–453 and 510–511.

Figure 3:
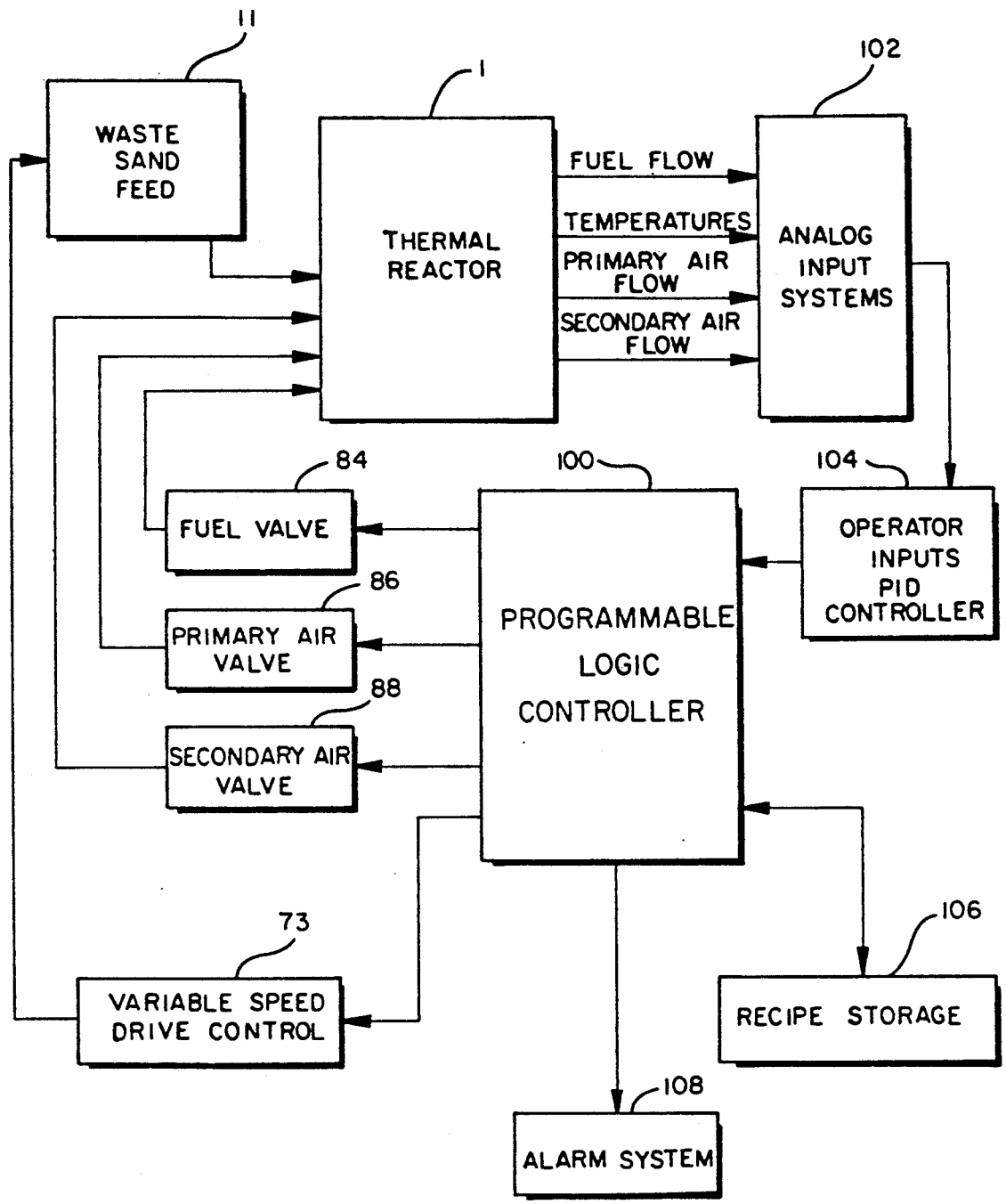
FIG. 3 is a schematic, block diagram of a control system which may be utilized to maintain precise control of the temperature of the waste sand grains in a triple fluid bed thermal reactor.

PID controllers utilize a control action in which the output is proportional to a linear combination of the input, the time integral of input and the time rate-of-change of the input. In a practical embodiment of a proportional plus integral plus derivative control action (PID) the relationship of output and input, neglecting high frequency terms, is $$\frac{Y}{X} = \pm P \frac{\frac{I}{s} + 1 + Ds \quad a > 1}{\frac{bI}{s} + 1 + \frac{Ds}{a} \quad 0 \leq b < 1}$$

where
- a = derivative action gain
- b = proportional gain/static gain
- D = derivative action time constant
- I = integral action rate
- P = proportional gain
- s = complex variable
- X = input transform
- Y = output With reference now to FIG. 3, there is depicted a high level schematic block diagram of a control system which may be utilized to maintain precise control of the temperatures of the waste sand grains in a fluid bed thermal reactor. As illustrated, the fluid bed thermal reactor 1 is depicted in block diagram form. Analog output signals representative of fuel flow, primary air flow, secondary air flow and various chamber temperatures are coupled to analog input system 102. Analog input system 102 is preferably utilized to convert analog input signals from the various thermocouples and flow meters into digital control signals which may be more efficiently utilized by a digital controller.

Next, the outputs from analog input system 102 are coupled to controller 104. Controller 104 may be implemented utilizing any suitable digital controller; however, a preferred embodiment of the present invention implements controller 104 utilizing a PID controller having a relationship between an input and an output such as that specified above. Controller 104 also preferably provides various operator input devices necessary for an operator to initiate or terminate the process described.

The outputs of controller 104 are then coupled to programmable logic controller 100 which utilizes those outputs in conjunction with various "recipes" stored within recipe storage 106 to control the oxidation and calcination of the waste foundry sands. These "recipes" are the specified relationships between the amount of natural gas required for a known amount of residual fossil fuel or residual resin binder fuel within the foundry sands to be reclaimed, for a preset process temperature. Examples of these relationships are set forth within FIGS. 1 and 2.

Programmable logic controller 100 is then utilized, in a manner well known in the art, to control the operation of fuel valve 84, primary air valve 86, secondary air valve 88 and variable speed drive control 73, as necessary to maintain the desired temperature sequences and heat energy levels for optimal oxidation and calcination of the waste foundry sands. By selectively varying the amount of fuel and air added to the fluid thermoreactor 1 while controlling the addition of waste sand by the waste sand feeder 11, optimal temperatures may be maintained for maximizing the reclamation of foundry sands. Additionally, programmable logic controller 100 may also be coupled to alarm system 108 to generate audible and/or visual alarms in response to an inability of the control system to achieve and maintain desired temperatures.

An invention has been provided with several advantages. The method for controlling the oxidation and calcination of waste foundry sands of the invention produces consistent physical and chemical sand properties of waste sands containing a random mixture of organic and inorganic binders. The method also maximizes the physical properties of the rebonded molds and cores, allowing the same or less resin binder to be utilized while ensuring the consistency of the sand quality.

The structure and operation of the fluid reactor 1 are described in greater detail in previously cited U.S. Pat. Nos. 4,549,698 and 4,978,076, the disclosure of which is incorporated herein by reference.

While the invention has been shown in only one of its forms, it is not thus limited but is susceptible to various changes and modifications without departing from the spirit thereof.

What is claimed is:

1. A method for controlling the oxidation and calcination of waste foundry sands during a thermal reclamation process, the waste foundry sands having binders with a fuel content adhering thereto, the method comprising the steps of:

passing the waste sands to a calcining chamber having a top, a floor and connecting sidewalls, the floor of the calcining chamber being provided with a plurality of vents the calcining chamber also being connected to a separate firebox capable of producing fluidizing hot gases for fluidizing the waste sands within the calcining chamber and forming a fluidized sand bed, the fluidizing hot gases being introduced to the calcining chamber by means of the floor vents;

producing fluidizing hot gases by combustion means in the firebox, wherein the combustion means includes a burner, a source of primary combustion air for the burner and a source of secondary combustion air for the firebox;

generating a first signal with a first signal generating means, wherein the first signal is representative of the temperature of the waste sands within the fluidized sand bed;

generating a second signal with a second signal generating means, wherein the second signal is representative of the volume of available free oxygen in the fluidizing hot gases within the firebox, leaving the firebox and entering the calcining chamber through the floor vents; and using control means to precisely control the temperature of the waste sand s within the fluidized sand bed with respect to a preselected set point, wherein the control means follows a temperature control method comprising the steps of:

analyzing the first and second signals generated by the first and second signal generating means, comparing the analyzed first and second signals with the preselected set point and adjusting the rate of waste sand feed to the calcining chamber and the quantity of supplementary fuel combusted in the firebox based on the comparison of the first and second signals with the preselected set point.

2. The method of claim 1, wherein the control means is a proportional, integral, derivative control system under the command of a preprogrammed logic computer.

3. The method of claim 1, further comprising the steps of calculating a heat energy requirement for calcining the waste foundry sands within the calcining chamber, the heat energy requirement being calculated by combining the heat energy content of the binder fuels adhering to the waste sand grains entering the calcining chamber together with the heat energy content of the combusted fluidized hot gases produced by the combustion means in the firebox, and by operating the control means to vary the mass flow rate of waste sand introduced into the calcining chamber, the volume of supplementary fuel supplied to the burner, the primary air supplied to the burner and the secondary air supplied to the firebox depending upon the heat energy requirement.

4. The method of claim 3, wherein the waste sands being introduced into the calcining chamber include sand grains having both organic and inorganic binders adhering thereto, and wherein the mass flow rate of the waste sands introduced into the calcining chamber, the volume of primary air and fuel supplied to the burner and the volume of secondary air supplied to the firebox are controlled to precisely control the temperature of the waste sands in the fluidized bed of the calcining chamber to maintain the temperature below a critical temperature at which the organic binders would be fused to the waste sand grains.

5. A method for controlling the temperature of waste sands providing the waste sands thermal reactor having at least a calcining chamber connected to a firebox;

producing a flow of fluidized hot gases by combustion means in the firebox, wherein the combustion means includes a burner, a source of supplementary fuel for the burner, a source of primary combustion air for the burner and a source of secondary combustion air for the firebox;

venting fluidized hot gases into a floor region of the calcining chamber from the firebox;

oxygenating the calcining chamber with free oxygen provided by the primary and secondary combustion air;

metering waste sands at ambient temperature into the waste sands thermal reactor wherein the temperature of the calcining chamber is being controller at a pre-set point, plus or minus 5° F. while controlling the available free oxygen content at a pre-set point plus or minus 2% by weight of the mass flow of fluidizing hot gases entering the calcining chamber from the firebox;

controlling the temperature of the waste sands in the calcining chamber and controlling the available free oxygen in the calcining chamber by adjusting the rate of waste sand feed to the preheated chamber and the quantity of supplementary fuel combusted in the firebox;

passing the calcined sand from the calcining chamber to a pre-cooling chamber; and discharging the sand from the pre-cooling chamber to a post-cooler pneumatic attrition clay de-duster to remove any remaining inorganic binders from the surface of the sand grains in the calcined sand.

6. The method of claim 5, further comprising the steps of calculating a heat energy requirement for calcining the waste foundry sands within the calcining chamber, the heat energy requirement being calculated by combining the heat energy content of the binder fuels adhering to the waste sand grains entering the calcining chamber together with the heat energy content of the combusted fluidized hot gases produced by the combustion means in the firebox.

7. The method of claim 6, wherein the process temperature of the waste sands within the calcining chamber is controlled by continuously adjusting the volume of supplementary fuel supplied to the firebox while sustaining a stoichiometric ratio with the primary combustion air and up to a 100% excess secondary air mixture for fluidizing the fluidized waste sand bed, and by continuously adjusting the volume of waste sands being fed to the fluid bed reactor based upon the calculated heat energy content of the binder fuels.

8. The method of claim 7, wherein the available free oxygen in the fluidized sand bed of the calcining chamber is used to chemically combine with the binder fuel on the sand grains, the available free oxygen content being maintained at a minimum of 10% by weight of the mass flow rate of hot fluidizing gases leaving the firebox and entering the calcining chamber by continuously adjusting the secondary air supply with respect to the primary air supplied to the firebox.

9. The method of claim 8, wherein all continuous adjustments to the rate of sand feed, the volume of supplementary fuel, the volume of primary combustion air, and the volume of secondary air within the fluid bed reactor are subject to a proportional, integral derivative, control system under the command of a preprogrammed logic computer for precisely controlling the temperature of the calcining fluid bed.

* * * * *